Dec. 9, 1930.    R. FITZ POWER    1,784,315
TRANSFER BINDING CASE AND RELEASE STAND THEREFOR
Filed July 13, 1927    2 Sheets-Sheet 1

Inventor: R. F. POWER.
per: Attorney

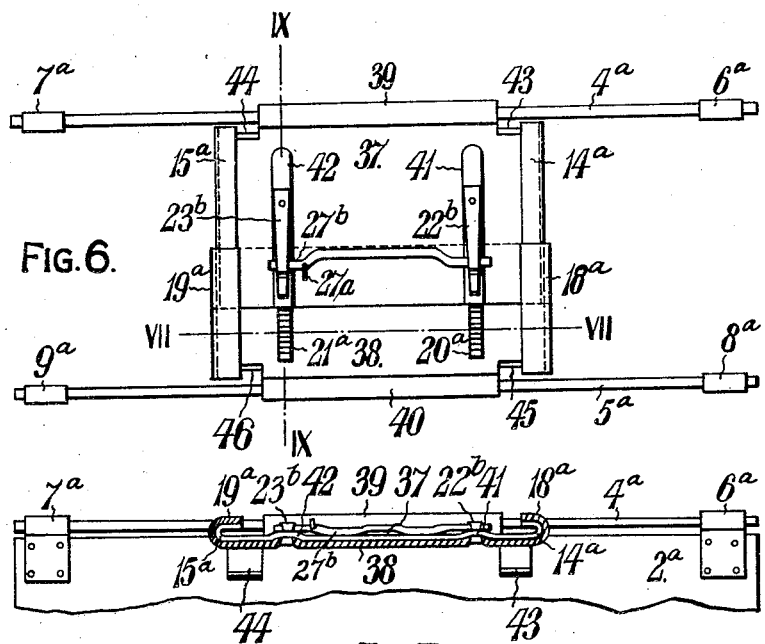
FIG.6.
FIG.7.
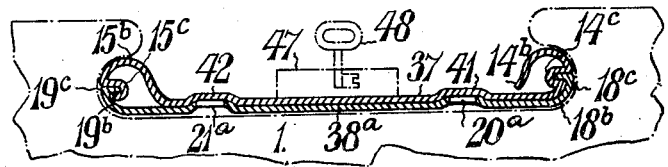
FIG.8.
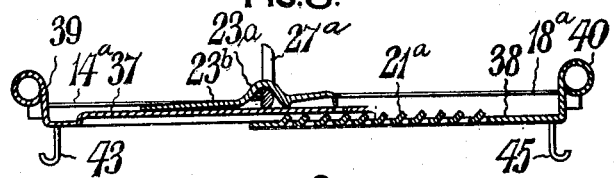
FIG.9.

Patented Dec. 9, 1930

1,784,315

UNITED STATES PATENT OFFICE

RICHARD FITZ POWER, OF HAMPSTEAD, LONDON, ENGLAND, ASSIGNOR TO MORLAND & IMPEY LIMITED, OF BIRMINGHAM, ENGLAND

TRANSFER-BINDING CASE AND RELEASE STAND THEREFOR

Application filed July 13, 1927, Serial No. 205,362, and in Great Britain September 25, 1926.

This invention relates to transfer binding cases for securing loose leaves, more especially leaves of the kind having on one edge open-faced recesses with undercut ends such for example as described in the specification left in connection with the application Serial No. 84,598 filed January 29, 1926.

The object of the invention is to provide a transfer binding case whereonto leaves can be conveniently disposed and rapidly removed, the transfer binder being easily operated and automatically adjustable over a large range of capacities, and also forming a convenient recipient for surplus leaves transferred from a binder according to the aforementioned application Serial No. 84,598.

A transfer binding case according to this invention comprises rigidly spaced pairs of anchoring members each pair being attached to a cover board, and one pair telescoping within the other, a toothed rack being associated with one or both of said pairs of anchoring members, and a spring-pawl device adapted to engage said rack being connected to the corresponding telescoping anchoring members, the anchoring members being disposed to occupy the undercut ends of the recesses of the leaves and therefore form an anchoring medium for said leaves, and the leaves being locked in position by a binding force exerted at right angles to the plane of said leaves, by binding plates attached to said telescoping anchoring members due to the engagement of said aforementioned co-acting rack and pawl. Means are provided for disengaging the said spring pawl from the said toothed rack consisting for example, of a cam device bearing on the spring arm of said pawl and lifting the toe thereof out of engagement with the teeth of the rack.

It should be understood that the above binding mechanism can be housed wholly within the recesses of the assembled leaves, and therefore within the superficial area of a mass of the leaves assembled on the binder, in contradistinction to such constructions where the binding mechanism has of necessity been positioned outside the area of the leaves, thereby increasing the size of the binder for a given size of leaf.

When it is desired to position leaves on the transfer binder or to remove leaves therefrom it is first necessary to operate the cam devices to release the pawls, when the telescopic anchoring members may be withdrawn wholly or partly from one another and whereafter two methods of removal may be utilized, the leaves either being withdrawn or replaced by being removed over the ends of the anchoring members when such are completely detached, or alternatively, where one leaf or a small number of leaves are to be positioned on the binder, by bending over one of the hooks forming the undercut end terminating in the recess and sliding the sheet laterally on to the anchoring members in which case it is unnecessary to completely detach the corresponding anchoring members from one another.

In a preferred construction of transfer binding case according to the present invention binding plate members are provided whereto are attached rigidly spaced telescopic anchoring members, spindles being attached to said plate members whereon the cover boards are pivoted by means of bushes housed on the ends of said spindles and secured to the cover boards. One pair of said anchoring members are constructed as ratchet posts sliding freely within corresponding tubular posts carried by the other binding plate member, such tubular posts having associated with them, spring pawls, the toes of which are adapted to engage said ratchet posts, and thus determine the gripping effect exerted by said aforementioned binding plate members on the leaves positioned by the anchoring members. Said spring pawls are each provided with a control cam positioned in a raised portion of the spring pawl and adapted, when manually operated, to release the pawls from engagement with the ratchet posts, whereby said plate members may be withdrawn from action on the leaves in order that leaves may be removed or replaced. To re-secure the leaves the said pawl control means may be re-set to anchoring position and on forcing the cover boards of the binder together, the pawls and ratchet posts automatically lock the corresponding anchoring members together and consequently, according to the pressure exerted, the binding plate members are caused to grip more or less the leaves contained in the binder.

By the automatic engagement of the pawl with the ratchet in the locking direction, considerable labour is saved when operating the binding case, the only movement necessary when re-securing leaves within the binder being the forcing together of the cover members, the binder automatically adjusting itself according to the number of leaves positioned upon it.

In a cheaper constructional form of binder the anchoring members in connection with each cover board are constructed of a single plate of suitable metal having a bushed end which houses the spindle pivotally carrying the cover board, the said plate members being curved or bent over at each side extremity, the curved portions of the plates occupying the undercut ends of the recesses of the leaves on the binder, and the plates being adapted to telescope one about the other, being prevented from relative displacement by the engagement between the curved ends. Beaten or stamped out of one of said plates are a pair of racks parallel with the anchoring edges, such racks preferably occupying recessed portions of the other plate whereon are mounted spring pawls for engagement with said racks, a projecting handle being provided in association with said pawls for disposing them out of engagement with the racks when it is desired to detach one cover board from the other. In place of a single binding plate associated with each pair of anchoring members, in this construction a pair of flange members are formed by being bent over from the material of the plates near their outer extremities, which flanges engage the assembled leaves and exert the necessary binding pressure.

The invention will be further described with reference to the accompanying drawings, in which:

Fig. 6 shows an embodiment of the invention in which each pair of anchoring members is constructed from a single plate;

Fig. 7 is a sectional view on the line VII—VII of Fig. 6;

Fig. 8 shows the manner in which a lock may be associated with the anchoring plates to prevent unauthorized use of the binder; and Fig. 9 is a detailed construction on the line IX—IX of Fig. 6 showing the manner in which the rack is pressed out from the plate member and the operation of the releasing handle of the ratchet-engaging pawl.

Figure 1:
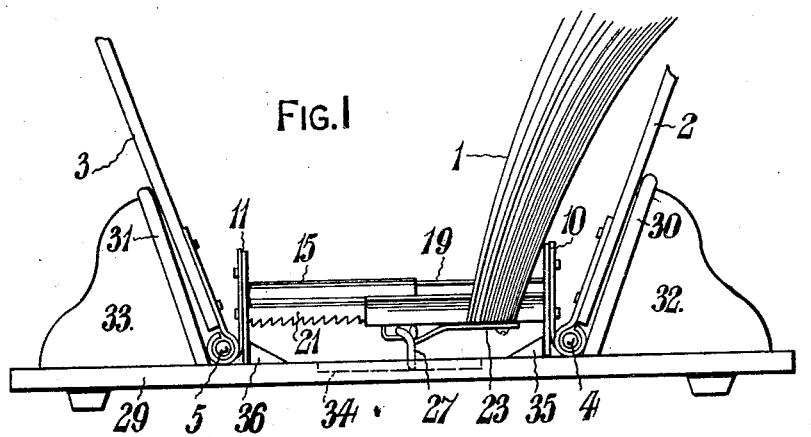
Fig. 1 is an end elevation of a binding case according to the invention disposed on an operating stand with the cover boards in the separated position.

Referring now to the drawings, but first more particularly to Figs. 1 to 5, the binding case consists of a pair of cover boards 2 and 3 mounted on spindles 4, 5, by means of eyelet bushes 6, 7 and 8, 9 respectively. Binding plates 10, 11 are each provided with bushes 12, 13 and 16, 17 respectively wherethrough the spindles 4 and 5 are threaded so that the cover 2 is pivotally mounted in regard to the binding plate member 10 and the cover board 3 is likewise mounted in regard to the binding plate 11. These binding plates 10 and 11 as hereinafter more fully explained are used to exert pressure on leaves such as 1 assembled in the binder and thereby prevent them from becoming displaced from the anchoring members now described.

The anchoring members consist of rigidly spaced posts 14, 15, attached to the binding plate 10 telescoping into corresponding hollow anchoring posts 18, 19, attached to the binding plate 11. The posts 14, 15 are provided with toothed racks 20, 21 disposed parallelly with the anchoring edges of the posts, while mounted on the hollow elements 16 and 17 are spring pawls 22, 23 secured by bolts 24, 25 respectively and passing through slots 18b, 19b, in the members 18, 19, and adapted to engage the racks 20, 21 so as to determine the distance apart of the binding plates 10, 11, and consequently the binding pressure exerted on the mass of leaves such as 1 assembled on a transfer binder. In order to release the pawls from the racks, manually operated cam levers 26, 27 are mounted between raised portions 22a, 23a, of the pawls 22, 23 and the body portion of the anchoring members 18, 19.

Figures 3, 4:
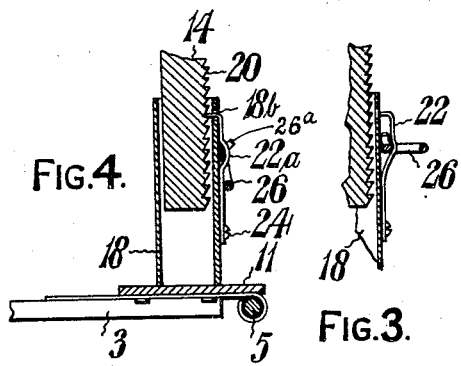
Figs. 3 and 4 are detailed views of the ratchet and pawl devices associated with the telescopic anchoring members in unlocked and locked position respectively.

Reference to Figs. 3 and 4 will show clearly the mode of operation of the cam levers 26, 27 whereon spigot stop members 26a, 27a, are provided, one on each of the levers to maintain them in the position (shown in Fig. 3) in which they hold the pawls 22, 23 out of engagement with the racks 20 and 21, the said spigots bearing on the body portion of the anchoring member 18 or 19. It will be seen from the slope on the teeth of the rack 20 that the telescoping of the posts 14 and 18 will be permitted in a closing direction even when the pawls are in the position shown in Fig. 4, that is in the engaged position, and this permits of the automatic engagement in the locking direction, operation of the cam levers 26, 27 being only necessary when it is desired to separate the binding plates 10, 11 of the binder.

Figure 5:
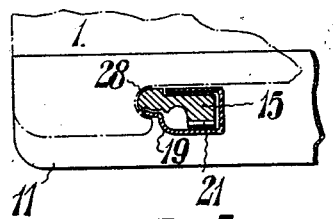
Fig. 5 shows the manner of constructing corresponding telescoping elements in order that the undercut ends of the recesses will be equally engaged by each of the two pairs of coacting members.

Reference to Fig. 5 shows the mode of disposition of the anchoring member 15 within the corresponding anchoring member 19, the latter member 19 being formed as a sleeve in which the anchoring member 15 rides, and a vertical slot in the sleeve casing of the anchoring member 19 adjacent the undercut ends 28 of the leaves 1 massed on the binder permitting a portion of the anchoring member 15 to project into the undercut ends 28 so as to render the anchoring edges of the two members contiguous in order that both will engage equally in the said undercut ends 28 of the leaves so as to firmly and evenly secure the entire mass of the leaves disposed on the binder.

The release stand member on which the binding case is shown mounted in Fig. 1 consists of a base portion 29 provided with outwardly tapering support members 30, 31 against which the cover boards 2 and 3 of the binder are adapted to rest when the stand is in use, such support members 30, 31, being held by angle members 32, 33 secured to the base board 29, slots 34 being provided in the base board for the reception of the control levers 26, 27.

In use the binding case is placed on the stand with the cam levers 26, 27 in the open position shown so that the pawls 22, 23 are out of engagement with the racks 20, 21, and the cover members 2 and 3 are separated until they abut against the support members 30, 31 respectively, the distance between said support members being determined so that the corresponding pairs of coacting anchoring members 14, 15 and 18, 19 do not become completely disengaged as clearly shown in Fig. 1. Abutment members 35, 36 are provided on the base portion 29 of the release stand member and consist in triangular pieces with their opposed faces at a suitable inclination, so that the binding plates 10, 11 of the binding case on being expanded are not impeded, and on reaching the summit of the incline, drop to the base board 29, and are then prevented from inward displacement by the outer vertical faces of the said abutment members 35, 36, thus preventing unwanted closing of the binding case. Leaves may then be removed from the binder or fresh leaves added or the relative dispositioning of individual leaves of the binder varied at the will of the operator.

Figure 2:
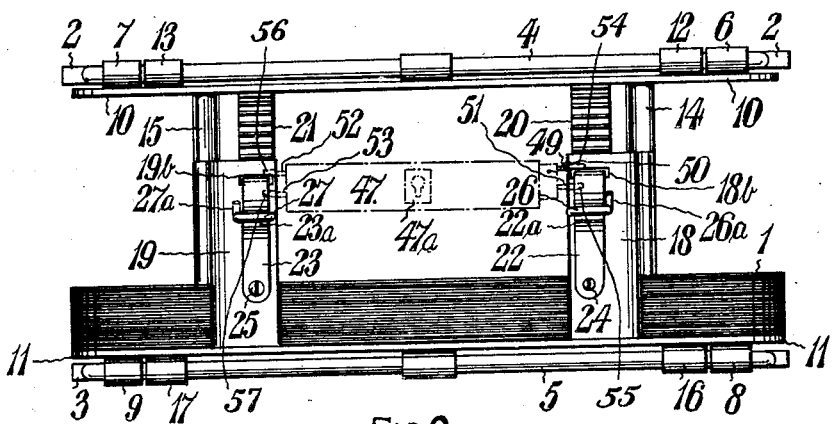
Fig. 2 is a rear view of the binding case showing the disposition of the telescopic anchoring members, and, in phantom, a lock for preventing unauthorized use of the case.

For large-sized binders the cover boards will be provided with further securing bushes between the two anchoring members as illustrated in Fig. 2.

Referring now more particularly to Figs. 6, 7 and 9 the anchoring members 14a, 15a and 18a, 19a are in this case constituted by the flanged or curved ends of metal plates 37, 38, the plate 37 being attached to its cover board by means of a spindle 4a passing through a bushing 39 formed by rolling over the outer end of the plate 37, said spindle 4a carrying eyelet bushes 6a and 7a secured to the cover board 2a. The plate 38 is provided with a bushing 40 through which the spindle 5a passes and the corresponding cover board is pivotally secured to the spindle 5a by means of eyelet bushes 8a and 9a. Racks 20a, 21a, are provided on the plate 38 and may be conveniently formed by being pressed out of the material of the plate as clearly illustrated in Fig. 9. A pair of rack guides or slots 41, 42 are formed in the plate 37 so as to permit of the sliding in and out movement of the racks, spring pawls 22b and 23b being associated with said plate 37 which are adapted to engage with the racks 20a and 21a in the manner described with reference to the construction shown in Figs. 1 to 5. To disengage the spring pawls 22b, 23b from the corresponding racks 20a, 21a, a cam lever 27b is provided which normally lies flush against the plate 37 with the said spring pawls engaging said racks and which is moved by hand into an upright position in regard to said plate to disengage said pawls 22b, 23b from their associated racks, being maintained in this position by a stop member 27a. With the cam lever 27b in its upright position the plates 37 and 38 are free relative one to the other and any leaves 1 mounted on the binder can be removed or other leaves may be added. For providing binding elements the plate 37 is turned over inwardly at 43, 44 and the plate 38 is correspondingly inwardly directed, the flange members 45, 46, so formed constituting binding plates which exert the necessary pressure on the leaves positioned in the binder to prevent their displacement from the anchoring members.

Referring now to Fig. 8, a lock 47 is associated with the plate 37, which in this construction has anchoring members 14b, 15b provided with cavities 14c, 15c, receiving the inturned portions 18c, 19c, of the coacting anchoring members 18b, 19b, mounted on the plate 38a. A key 48 is provided adapted to operate the lock 47, such lock fixing the relative position of the plates 37, 38 and preventing unauthorized use of the binding case.

A lock device 47 for preventing unauthorized use is also shown in dot and pick lines associated with the binder illustrated in Fig. 2. A key-hole 47a is provided for the insertion of a key (not shown) which key operates to project a bolt 49 whereon spring-loaded plunger pins 50, 51, are positioned to engage with aligned holes 54, 55 provided for the purpose on the anchoring members 14, 18. Similar spring plunger pins 52, 53 fitted on the other end of the device 47 engage correspondingly aligned holes 56, 57 in the members 15 and 19 and definitely prevent any alteration in the placing of the binding plates 10, 11, and thereby any loss or removal of leaves from the binding case.

What I claim is:—

1. A binding case for securing loose leaves of the kind having on one edge open-faced recesses with undercut ends, comprising binding elements for clamping the loose leaves, telescopic anchoring members mounted on said binding elements and parts of which occupy said undercut ends, and self-locking means in said telescopic members for holding said binding elements in clamping relation to the leaves.

2. A binding case for securing loose leaves of the kind having on one edge open-faced recesses with undercut ends, comprising pairs of rigidly spaced anchoring members located within the recess and parts of which occupy said undercut ends, one pair being tubular and receiving the other telescoping pair, on each of which is provided a toothed rack, and spring pawls associated with said tubular pair and engaging said racks.

3. A binding case for securing loose leaves of the kind having on one edge open-faced recesses with undercut ends, comprising pairs of rigidly spaced anchoring members, one pair being slidable within the other, a binding plate carrying each pair of said members, a toothed rack provided on one pair of said members and a spring pawl for engagement with said rack provided on the other pair, and manually operable control means for disengaging said pawl from said rack.

4. A binding case for securing loose leaves of the kind having on one edge open-faced recesses with undercut ends, comprising a pair of cover boards, a pair of rigidly spaced ratchet posts attached to one of said cover boards located in part in said undercut ends, a corresponding pair of telescopic housing members attached to the other cover board and adapted to slide over said ratchet posts also located in part in said undercut ends, and spring pawls associated with said telescopic members and adapted to engage the said ratchet posts.

5. A binding case for securing loose leaves of the kind having on one edge open-faced recesses with undercut ends comprising a pair of cover boards, a pair of rigidly spaced ratchet posts attached to one of said cover boards located in part in said undercut ends, a corresponding pair of telescopic housing members for said ratchet posts attached to the other cover board and adapted to slide over said posts also located in part in said undercut ends, spring pawls adapted to engage said ratchet posts and a manually operated cam device for rendering each of said spring pawls inoperative to release the leaves.

6. A binding case for securing loose leaves of the kind having on one edge open-faced recesses with undercut ends comprising binding plates, pairs of rigidly spaced leaf-anchoring members attached to said binding plates, one pair being adapted to telescope within the other pair, ratchets mounted on one of said pairs, spring-pawl devices associated with the other of said pairs, spindles attached to said binding plates and cover boards pivotally mounted on said spindles.

7. A binding case for securing loose leaves of the kind having on one edge open-faced recesses with undercut ends, comprising pairs of telescoping anchoring members located within the recesses and parts of which occupy said undercut ends, one pair being tubular and receiving the other telescoping pair, said tubular pair having each a longitudinal slot therein, flanges on said other telescoping pair passing through said slots and engaging said undercut ends and means on said tubular pair for binding together the leaves in a direction at right-angles to their plane.

8. A binding case for securing loose leaves of the kind having on one edge open-faced recesses with undercut ends, comprising binding plates, rigidly spaced ratchet posts attached to one of such binding plates located in part in said undercut ends, correspondingly spaced receiving anchoring members telescoping over said ratchet posts and attached to the other binding plate and also occupying in part said undercut ends, spring-pawl devices associated with said second pair of anchoring members and adapted to engage said ratchet posts, manually operated cam control members for disengaging said spring pawls from said ratchets, and cover boards pivotally mounted on spindles attached to said binding plates.

9. A binding case for securing loose leaves of the kind having on one edge open-faced recesses with undercut ends, comprising pairs of rigidly spaced anchoring members, one pair being mounted on each cover of the binder and one pair being slidable within the other, locking mechanism including a spring-pawl associated with one pair of said bars, and a ratchet associated with the other of said pairs, and an operating stand for said binder provided with spaced supports for the covers of the binder and cavities for housing portions of said locking mechanism.

10. A binding case for securing loose leaves of the kind having on one edge open-faced recesses with undercut ends, comprising pairs of rigidly spaced anchoring members, one pair being slidable within the other, binding plates each carrying a pair of said anchoring members, spindles attached to said binding plates, cover boards pivotally mounted on said spindles, adjustable locking means for securing said binding plates in definite spaced relation, and an operating stand for said binder including spaced supports for the cover boards of the binder and troughs for receiving the actuating portion of said locking means.

11. A binding case for securing loose leaves of the kind having on one edge open-faced recesses with undercut ends, comprising pairs of rigidly spaced anchoring members, one pair being mounted on each cover of the binder and one pair being slidable within the other, locking mechanism including spring-pawls associated with one pair of said bars, and ratchets associated with the other of said pairs and an operating stand for said binder provided with spaced supports for the cover boards of the binder, and abutment blocks which engage the insides of the covers of the binder and prevent their inward movement, said stand being also adapted to house portions of said locking mechanism.

12. A binding case for securing loose leaves of the kind having on one edge open-faced recesses with undercut ends, comprising pairs of rigidly spaced anchoring members, one pair being slidable within the other, binding plates each carrying a pair of said anchoring members, spindles attached to said binding plates, cover boards pivotally mounted on said spindles, adjustable locking means for securing said binding plates in definite spaced relation, and an operating stand for said binder including spaced supports for the covers of the binder, troughs for receiving the actuating portions of said locking means and abutment plates which engage the aforesaid binding plates so as to prevent their inward movement during operation of the binder.

In testimony whereof I affix my signature.

RICHARD FITZ POWER.